United States Patent Office 3,285,860
Patented Nov. 15, 1966

3,285,860
**METHOD OF PREPARING NICKEL-MOLYB-
DENUM-ALUMINA CATALYSTS**
Ryden L. Richardson, Fullerton, Calif., assignor to Union Oil Company of California, Los Angeles, Calif., a corporation of California
No Drawing. Filed Dec. 9, 1963, Ser. No. 329,314
11 Claims. (Cl. 252—465)

This invention relates to catalysts which are useful in the hydrorefining of petroleum hydrocarbons particularly where desulfurization and a high degree of denitrification are desired, e.g., when treating hydrocarbons rich in nitrogen contaminates and/or where a very low nitrogen as well as sulfur content is necessary in the refined distillate.

The hydrofining of petroleum hydrocarbons, generally distillates, is performed by contacting the hydrocarbon with hydrogen in the presence of a contact mass having catalytic activity for the desired reactions. Heretofore the primary reaction desired has been desulfurization of the hydrocarbon, although the art has been cognizant that simultaneous denitrification also occurs. Commonly used contact masses have been the mixed oxides and sulfides of molybdenum with cobalt and/or nickel which are distended over a suitable carrier such as alumina or silica stabilized alumina.

The trend of refinery practice has been to increase the extent of operations which are sensitive to nitrogen contaminates, thus resulting in a reduction in the permissible nitrogen content of hydrocarbon feed stocks. This reduction in permissible nitrogen level in feed stocks has emphasized the need for hydrofining catalysts which have high denitrification activity as well as the more commonly sought desulfurization activity. To illustrate, the demand for high octane gasoline stocks has increased reforming capacity with platinum-alumina catalysts which are very sensitive to nitrogen poisoning. Additionally, highly active hydrocracking catalysts have been developed which are, unfortunately, sensitive to nitrogen contaminates. Finally, the problem is intensified by increased refinery runs of lower value crude oils which are high in nitrogen contaminates as well as the possible utilization of shale oil, a stock rich in nitrogen contaminates.

It is, therefore, an objective to prepare a hydrofining catalyst having enhanced denitrification properties.

It is also an objective to prescribe the use of such catalysts in the hydrofining of petroleum hydrocarbons.

Other and related objectives will be apparent from the following disclosure.

I have found that the denitrification activity of hydrofining catalysts containing mixtures of Group VI and Group VIII metals can be substantially enhanced by distending these oxides on an alumina carrier which has been leached with an acid. The activity of these catalysts is particularly enhanced when the so-leached carrier is thereafter aged in ammonium hydroxide. Catalysts prepared from alumina treated in this manner have substantially lower alkali and alkaline earth metal contents and possess greatly increased permeability or diffusivity than the catalysts prepared from untreated carriers. The greater diffusivity of the catalysts results in greater activity for liquid phase or mixed phase catalysis. Additionally, I believe the ammonium hydroxide treatment of the carrier subsequent to the acid leaching step precipitates fresh alumina hydrogel and removes undesired anions, thereby contributing to its greater activity.

While carriers treated in the aforedescribed manner can be used to prepare highly active hydrofining catalysts, I have found that their properties are utilized to the maximum degree when the catalytic metals such as chromium, tungsten and molybdenum of the Group VI and nickel or cobalt of the Group VIII metals are applied to the carrier with the Group VIII metal impregnation preceded and followed by separate impregnations of the Group VI metal.

I have further discovered that high denitrification activity can be imparted to the aforementioned catalysts by the use of multiple impregnations of the Group VIII metal, each impregnation being followed by drying and calcination. While a substantial enhancement in denitrification can be achieved with such multiple impregnations of any carrier even without a final impregnation with a Group VI metal, I have found that the maximum activity is achieved when the multiple impregnations of the Group VIII metal are preceded and followed with Group VI metal impregnation. Such maximum activity is further enhanced, particularly for liquid phase or mixed phase catalysis, when the molybdenum-multiple nickel-molybdenum sequence is applied to the aforedescribed acid leached, ammonium hydroxide aged alumina. The invention has thus been described with reference to Group VIII and Group VI metal catalysts. Hereafter the catalyst will be referred to as a nickel-molybdenum catalyst as these are the preferred Group VIII and Group VI metals, being understood, however, that comparable improvements being obtainable with the cobalt, tungsten or chromium containing catalysts.

The catalysts of my invention are useful for the hydrofining of petroleum and coal tar hydrocarbons. In general, the catalysts are employed at temperatures between about 600° to about 1000° F. and pressures between atmospheric and about 10,000 p.s.i.a. or more. The hydrocarbon can be supplied to the reactor at space velocities between about 0.2 and 10.0 volumes of liquid per volume of catalysts per hour with between about 500 to about 10,000 standard cubic feet of hydrogen per barrel of liquid hydrocarbon. As apparent to those skilled in the art, the particular set of conditions can be varied to achieve the desired degree of desulfurization and/or denitrification for the particular stock. To favor denitrification, temperatures from about 500° to about 1000° F. pressures from about 100 to about 5000 p.s.i.a. and recycle gas rates from about 200 to about 10,000 standard cubic feet per barrel of hydrocarbon with about 0.5 to about 20 liquid volumes hydrocarbon per hour per volume of catalyst are employed. Preferred conditions are about 600° to about 875° F., about 500 to about 3000 p.s.i.a., about 500 to about 5000 standard cubic feet per barrel of hydrocarbon and between about 1 and about 5 liquid feed volumes per hour per volume of catalyst.

As apparent to those skilled in the art, the catalyst is used under conditions which are altered during the run to offset the decline in catalyst activity and thereby maintain a constant degree of denitrification and/or desulfurization. When the catalyst has declined in activity to a level where the desired hydrofining can not be accomplished without raising the temperature to a level where undesired cracking occurs, the run is terminated and the catalyst is regenerated. Generally, the run is initiated at relatively low temperatures and the temperature is periodically raised during the run for a total increment between about 25° to about 300° F. or more. Generally, when hydrofining gasoline stocks, the maximum permissible or terminal temperature will be between about 775°–850° F., while with heavier distillates such as gas oils the terminal temperature will be between about 750°–775° F.

The duration of the run generally is between about 100 and about 300 days and depends on the necessary initiating temperature, maximum permissible terminal temperature and the rate of activity decline of the catalyst. Generally, run lengths of 100 to 300 days are obtainable with my catalysts.

During use, varying amounts of deposits, mostly carbon, nitrogen and sulfur, accumulate on the catalyst and these must be removed by periodic generation. Their removal is accomplished by contacting the catalyst with air, diluted with inert gases such as flue gas, steam, nitrogen, etc., at temperatures between about 750° F. and about 1100° F. The rate of combustion of the deposits can be controlled to prevent overheating of the catalyst by various methods, control of the dilution of the air, regeneration temperature, etc. Generally, the regeneration is completed with undiluted air at the aforementioned temperatures.

While the catalyst in the oxide form is quite active for hydrofining operations, it is most active in the sulfided form. This form is prepared by contacting the catalyst, prior to its use, with a non-coking sulfiding agent such as gases containing hydrogen sulfide, carbon disulfide, methyl, ethyl or propyl mercaptans, etc. Preferably, hydrogen sulfide is used, diluted with hydrogen or recycle gas from the reaction. In general, a gas stream containing from 1 to about 50 volume percent hydrogen sulfide in a hydrogen rich stream, e.g., recycle gas is used to sulfide the catalyst at temperatures from about 0°–800° F. for 0.5 to 12 hours, preferably until the catalyst is completely sulfided as evidenced by appearance of hydrogen sulfide in the off-gases or by failure of the catalyst to absorb further quantities of hydrogen sulfide.

Normally, the sulfiding is initiated at low temperatures, e.g., 70°–200° F. and/or low hydrogen sulfide gas concentrations, e.g., 0.5 to 5 volume percent, so as to avoid overheating the catalyst from the exothermic sulfiding reaction. Preferably, the sulfiding temperature is permitted a controlled rise so that the sulfiding is completed at temperatures from about 500°–700° F. to insure thorough sulfiding and to desorb water from the reaction. Low pressures, e.g., atmospheric to about 50 p.s.i.g. are preferred to favor complete water desorption.

If desired, the calcined new catalyst or regenerated used catalyst can be partially reduced with hydrogen by contacting the oxide form with a hydrogen containing gas at a temperature between about 400°–750° F. for a time from 10 minutes to about 3 hours. This partial reduction with hydrogen will reduce the exothermic reaction encountered in the succeeding hydrogen sulfide treatment, which can be initiated simply by introducing the desired content of hydrogen sulfide into the hydrogen stream after the aforementioned time period.

The catalysts of my invention can be employed as granules, extrudates, pellets, lumps or the like, ranging in size from about 1/16" to about 1/2" in average diameter. With the preferred treatment, i.e., acid leaching and ammonium hydroxide ageing, the pelleted carriers are preferred since they have adequate diffusivity, high strength and high bulk density.

The pellets can be disposed as a stationary bed in a reactor and the feedstock—preheated to the reaction temperature and admixed with the recycle hydrogen rich gas—is introduced therein to contact the catalyst. Gasoline stocks are generally vaporized at the reaction conditions so that their hydrofining is performed in the vapor phase. Gas oils and heavier hydrocarbons, however, are at least partially in liquid phase conditions. The acid leached-ammonium hydroxide aged pellets are of particular advantage with the latter stocks since their high permability offsets the low diffusivity encountered in liquid phase catalysis.

The feedstock is passed through the reactor in upflow or downflow fashion, concurrent with or counter-current to the flow of the recycle gas stream. The refined products are recovered in conventional manner, i.e., fractionation and separation of the hydrogen rich gas which is recycled.

Feedstocks which can be treated include any mineral oil stock boiling between about 100° and 1000° F. and containing between about 0.001 and 10.0 weight percent of combined nitrogen. Such stocks can also contain from about 0.01 to about 5.0 weight percent combined sulfur. Specific examples include crude oils, reduced crudes, deasphalted reduced crudes, light gas oils, heavy gas oils, kerosene, solvent naphthas, fuel oils, Diesel oils, jet fuels, heavy naphthas, light naphthas, cycle oils from cracking, coker distillates, cracked gasolines, etc. These stocks can be obtained from petroleum, shale, tar sands, coal tars, or other natural sources. Stocks rich in nitrogen contaminates, from about 0.1 to about 3 weight percent nitrogen are especially amenable to treatment with my catalysts.

Suitable adsorbent carriers for my catalyst are various alumina compositions, aluminum silicates, zeolites or alumina. Preferred are those consisting predominately of alumina, particularly activated or gamma alumina. Preferably, the alumina also contains a minor proportion, e.g., about 3 to about 30 weight percent of co-precipitated silica gel. The co-precipitated carrier can be prepared by passing carbon dioxide through an aqueous solution of sodium aluminate and sodium silicate. The co-precipitated gel is then drained, washed, and compressed into pellets which are calcined at an appropriate temperature, e.g., about 700° to about 1200° F.

Various alumina and silica compositions, particularly zeolites, can also be employed as the carrier. Such compositions can be naturally occurring or synthetically prepared zeolites such as chabazite, gmelenite or faujasite as well as synthetic zeolites. These materials are partially dehydrated crystalline composition of silica and alumina and contain quantities of one or more exchangeable cations such as sodium, potassium, hydrogen, magnesium, calcium, etc. The compositions are characterized by crystal pores of relatively uniform diameter between about 5 and 14 A. Several crystal forms of such molecular sieves are now available and suitable for use herein as the carrier such as the "X," "Y," "L," "J" crystal types. The sieves can be treated prior to deposition of the aforementioned catalytic metals by ion exchanging the monovalent alkali metal cation with a divalent metal. Also the sieves can be "decationized" by ion exchange with an ammonium salt followed by heating to decompose the zeolitic ammonium ion and leave a hydrogen ion. Any of the aforementioned carriers can be impregnated with appropriate aqueous solutions of molybdenum and nickel salts in the manner and sequence hereafter set forth.

While the aforedescribed alumina compositions and, particularly, the alumina containing minor proportions of silica can be used as a carrier for my catalysts which have an enhanced denitrification activity because of multiple nickel and/or multiple molybdenum impregnations, I have found that the steps of acid leaching and ammonium hydroxide aging of the carrier prior to these impregnations imparts even greater activity to the catalyst. Indeed, alumina when treated in this fashion results in catalysts having increased activity, when impregnated with other metal salts, notably nickel and molybdenum whether the carrier is co-impregnated or alternately impregnated with salts of these metals.

The acid leached and ammonium hydroxide aged carrier exhibits a higher activity than conventional carriers with molybdenum-nickel catalysts. This activity increase is present when the metals are co-impregnated onto the carrier or when they are separately applied. As hereinafter set forth, however, the most active catalyst is obtained by a very specific multiple step impregnation of molybdenum and nickel onto the acid leached ammonium hydroxide aged carrier. Additionally, the multiple impregnation of the catalytic metals can be applied to a conventional alumina carrier that has not been acid leached or that has been acid leached but not aged in ammonium hydroxide and an enhanced catalytic activity will nevertheless be observed as a result of the multiple impregnations. Again, however, the most highly active catalyst is achieved by the combination of all these features.

The alumina or alumina-silica carriers which have been pelleted and calcined in the aforecited manner are preferably leached with an acid under conditions to remove between about 1 and about 20 weight percent of the metal oxide, most preferably to remove between about 3 and about 7 weight percent.

Various acids can be used such as strong mineral acids, e.g., hydrochloric, hydrofluoric, nitric, sulfuric, phosphoric, or organic acids, e.g., acetic, citric, oxalic, etc. Generally, aqueous solutions of these acids having strengths between about 0.1 and about 5 normal.

The carrier is leached by immersing it in the aqueous acid at temperatures between about 75° and about 220° F. for a sufficient time; generally 3 to 60 minutes; to leach the desired amount of metal oxide from the pellet. Preferably, the acid is stirred during the leaching step.

When the necessary amount of metal oxide has been leached from the carrier, the pellets are removed from the acid and drained. The pellets can then be washed; however, preferably they are treated with dilute; about 1 to about 10 weight percent; ammonium hydroxide to neutralize residual acid and to precipitate a fresh layer of alumina on the pore surfaces. The ammonium hydroxide treatment is performed at a temperature between about 75° to about 200° F.; preferably between about 130° and about 150° F. for from 5 minutes to about 2 hours. One or more of these ammonium hydroxide washings can be used as desired.

After the final ammonium hydroxide wash, the carrier is preferably aged in ammonium hydroxide at a pH from about 9.5 to about 11 at the aforementioned temperatures, preferably between about 130° and about 150° F. for about 2 to about 24 hours; preferably 16 to 20 hours. After the desired aging period, the pellets are removed, drained, dried and finally calcined in air or other inert gases at a temperature between about 750° and about 1100° F.

The catalyst metals, molybdenum and nickel, are applied to the carrier by impregnation with an aqueous or ammoniacal solution of soluble salts of the metals. Preferably impregnation sequences set forth hereinafter are used. Regardless of the sequence of impregnation, however, aqueous solutions of soluble molybdenum salts such as molybdenum chloride, ammonium sulfomolybdate, or, preferably, ammonium molybdate are used. The concentration of the salt in the solution can be between about 5 to about 50 grams calculated as $MoO_3$ per 100 milliliters and this concentration can be varied to serve as the control on amount of metal oxide deposited in the impregnation step. The preferred solution is prepared by dissolving ammonium paramolybdate in aqueous ammonia (10–20 percent ammonia) and the resulting mixture is then diluted with distilled water or dilute aqueous ammonia to form a clear ammonium molybdate solution of the desired concentration.

The nickel impregnating solution can be an aqueous or ammoniacal solution of any soluble nickel salt such as nickel nitrate, nickel acetate, nickel sulfate, etc., although the former is preferred. In general, solutions containing from about 0.2 to about 50 grams of nickel as NiO per 100 milliliters can be used, the concentration being chosen to provide the amount of impregnation desired in any single step.

As previously mentioned, I have discovered that a high degree of catalytic activity, particularly for denitrification is attained by proper sequence of the impregnation steps. In all cases, I prefer to employ a molybdenum impregnation for the first step. Preferred sequences are as follows: Mo-Ni-Ni; Mo-Ni-Mo; Mo-Ni-Ni-Mo; etc. A greater number of impregnation steps can be employed, if desired, preferably such additional impregnations should be of the nickel component.

In general, between about 3 and about 20 weight percent molybdenum (calculated as trioxide) should be applied in this step. In instances when molybdenum is applied only in the first impregnation, between about 10 and about 20 weight percent molybdenum (calculated as trioxide) is so applied. When the final impregnation of the carrier is also to be molybdenum, then the amount applied in the first and last impregnations can be divided therebetween, between about 3 and about 17 weight percent molybdenum (calculated as trioxide) being applied in each step for a final content of between about 10 and 20 weight percent.

The nickel oxide component of the catalyst should be applied subsequent to a molybdenum impregnation and can be applied in one or more impregnations. I have found that a greater degree of activity is generally achieved by multiple nickel impregnations than obtained if all the nickel is applied in a single step. Preferably, the nickel impregnation is followed by a final molybdenum impregnation. Generally between about 3 and about 12; preferably between about 5 and 10, and most preferably about 7; weight percent nickel (calculated as oxide) should be applied. Preferably this amount is divided equally between the multiple impregnations.

The carrier is removed from and drained after each impregnation step and then calcined in a stream of air, carbon dioxide, nitrogen or other inert gas. The calcination temperature can be from 750° to about 1150° F., preferably about 800° to about 1000° F., and most preferably between about 800° and about 900° F. The calcination is performed for about 30 minutes to about 6 hours, preferably from about 1 to about 3 hours.

The following examples will serve to illustrate my invention:

Example 1

An alumina-silica gel was prepared from an aqueous solution of sodium aluminate and sodium silicate by passing carbon dioxide into the solution. The gel was drained and washed with deionized water, dried and compressed into pellets, ⅛ by ⅛ inch. The pellets had an average crushing strength of about 15–20 pounds and the following content of metal oxides:

| | Weight percent |
|---|---|
| Alumina | 95 |
| Silica | 5 |
| Calcium oxide | <0.2 |
| Sodium oxide | <0.03 |

Some of these pellets were leached in an aqueous acid, 4.5 weight percent hydrochloric acid, for 10 minutes at 200° F. The pellets were then removed from the acid, drained and washed twice with 1.2 volumes of dilute (2 weight percent) aqueous ammonium hydroxide. After washing, the pellets were added to 2 weight percent aqueous ammonium hydroxide and were held in this solution for 6–20 hours at 130°–150° F. The pellets were then removed, drained, filtered, dried in an oven at 220° F. and, finally, calcined for two hours at 800° F. The carriers prepared in this manner were used in the impregnations set forth in the next example.

Example 2

Aqueous ammoniacal solutions of ammonium molybdate and aqueous solutions of nickel nitrate were used to impregnate the aforedescribed carriers. The following table summarizes the impregnation sequences and the amount of metal oxides so deposited. In all cases, the impregnation step was performed by immersing the pellets in the solutions for 5–10 minutes, then removing and draining, drying in an oven at 220° F. and, finally, calcining in air at 800° F. for 2 hours.

TABLE 1

| Catalyst | Carrier | Impregnation Sequence | Metal Content, Wt. Percent | |
|---|---|---|---|---|
| | | | NiO | MoO₃ |
| A | Unleached | Mo-Ni-Mo | 3.6 | 13.9 |
| B | Unleached | Mo-Ni-Ni-Mo | 5.2 | 9.7 |
| C | Leached¹ | Mo-Ni-Ni-Mo | 6.8 | 10.5 |
| D | Leached-aged | Mo-Ni-Ni-Mo | 6.8 | 11.2 |
| E | Unleached | Mo-Ni-Ni | 6.0 | 15.0 |

¹ The carrier was leached as described in Example 1, but the washing and aging in ammonium hydroxide was omitted, instead the carrier was washed with deionized water, drained, dried and calcined.

*Example 3*

Catalysts A through D were employed in a fixed bed to hydrofine a coker gas oil at 700° and 725° F. The gas oil was typical of high nitrogen content distallates and had the following properties:

Gravity, ° API _____ 22.1
Atmospheric distillation, ° F _____ 240–860
Sulfur content, percent _____ 2.09
Nitrogen content, total, p.p.m _____ 3490
Nitrogen content, basic, p.p.m _____ 1290

Prior to their use, the catalysts were sulfided by passing a gas stream of hydrogen containing 7 volume percent hydrogen sulfide through the bed at 700° F. After the catalyst was completely sulfided the reactor was pressured to 1500 p.s.i.g. and the gas oil, preheated to the reactor temperature, was introduced at a liquid hourly space velocity of 2.0. Hydrogen was introduced at a rate of 8000 standard cubic feet per barrel of feed. The following table summarizes the results as well as the results which can normally be expected under these conditions when a prior art catalyst is used which contains about 3 percent nickel oxide and 14 percent molybdenum trioxide on alumina, the metal oxides being impregnated in separate single steps, first a single molybdenum, then a single nickel impregnation.

(4) The combination of acid leaching and ammonium hydroxide aging of the carrier with a Mo-Ni-Ni-Mo impregnation sequence provided the most active catalyst for denitrogenation and desulfurization.

*Example 4*

Catalysts B, D and E, as well as the aforedescribed prior art catalyst, were employed to hydrofine a naphtha distillate having the following properties:

Gravity, ° API _____ 27.2
Atmospheric distillation, ° F _____ 200–432
Sulfur, percent _____ 1.18
Nitrogen (basic), p.p.m _____ 140

The catalysts were presulfided prior to use in the manner described in Example 3. The hydrofining conditions were 672° F., 600 p.s.i.g., 8.0 liquid hourly space velocity and 3000 standard cubic feet of hydrogen per barrel of feed. The following table summarizes the results:

| Catalyst | Product Analysis | |
|---|---|---|
| | Nitrogen, ppm. | Sulfur, Percent |
| Prior Art | 22 | 0.017 |
| B | 6 | 0.014 |
| D | 13 | 0.011 |
| E | 15 | 0.012 |

The preceding example demonstrates that the multiple nickel impregnation steps secures an improvement in hydrofining activity, particularly when the final impregnation step is with the molybdenum containing solution. The example further demonstrates that the enhanced activity from acid leaching and alkali aging, witnessed on gas oil stocks, is not present during vapor phase reactions such as naphtha hydrofining.

*Example 5*

Aqueous ammoniacal solutions of ammonium molybdate and aqueous solutions of nickel nitrate were used to impregnate a second set of carrier pellets. The carriers

TABLE 2

| Catalyst | Product Analyses | | | | | |
|---|---|---|---|---|---|---|
| | 700° F. Experiment | | | 725° F. Experiment | | |
| | Sulfur (Lamp) Percent | Nitrogen | | Sulfur (Lamp) Percent | Nitrogen | |
| | | Kjeldahl, p.p.m. | Basic, p.p.m. | | Kjeldahl, p.p.m. | Basic, p.p.m. |
| Prior Art | 0.23 | 1,576 | 667 | 0.12 | 1,236 | 499 |
| A | 0.26 | 1,420 | 588 | 0.13 | 1,040 | 407 |
| B | 0.23 | 1,221 | 526 | 0.12 | 995 | 372 |
| C | 0.19 | 1,470 | 620 | 0.08 | 1,040 | 420 |
| D | 0.14 | 1,070 | 404 | 0.06 | 700 | 247 |
| E | 0.27 | 1,430 | 603 | 0.11 | 1,100 | 444 |

The following conclusions are obtained from comparison of the preceding data:

(1) Since all the test catalysts, A through E, had a greater denitrogenation activity than that of the prior art, multiple impregnations of the metal oxides improves denitrogenation activity;

(2) Multiple impregnations of nickel imparts greater denitrogenation activity than does a single impregnation of nickel (catalyst E vs. prior art);

(3) Preceding and following the nickel impregnation with molybdenum impregnation steps imparts greater catalytic activity than when a nickel impregnation is the last step (catalysts E vs. B and catalysts A vs. prior art);

were ⅛ by ⅛ inch pellets of a silica stabilized alumina of substantially the same composition as the carrier of Example 1. A portion of the pellets were leached in 5.0 weight percent hydrochloric acid for 15 to 18 minutes at 200° to 210° F., then washed twice with dilute ammonium hydroxide and aged in 2 weight percent aqueous ammonium hydroxide for 16 to 20 hours at 130° to 150° F. The leached and aged pellets were then drained, washed, dried in an oven at 220° F., and calcined at 800° F. for 2 hours.

Each impregnation of the carriers was performed by immersing the pellets in the particular solution for 5 to 10 minutes, drying at 220° F. and calcining in air for 2 hours prior to the succeeding impregnation. The following table summarizes the impregnation sequences:

TABLE 3

| Catalyst | Carrier | Impregnation Sequence | Metal Content, Wt. Percent | |
|---|---|---|---|---|
| | | | NiO | MoO₃ |
| F | Unleached | Mo-Ni | 7 | 18 |
| G | Leached-aged | Mo-Ni | 6 | 17 |
| H | Unleached | Mo-Ni-Ni-Mo | 9 | 13 |
| I | Leached-aged | Mo-Ni-Ni-Mo | 7 | 14 |

The catalysts were evaluated by using them as a fixed bed to hydrofine a coker gas oil at 700° and 725° F. in the same procedure as employed in Example 3. The gas oil was of the same stock employed in Example 3 and had a nitrogen content of 1222 parts per million. The following table summarizes the results:

TABLE 4
Product Analysis, Basic Nitrogen

| Catalyst | 700° F. Experiment | 725° Experiment |
|---|---|---|
| F | 291 | 166 |
| G | 240 | 133 |
| H¹ | 238 | 168 |
| I | 197 | 100 |

¹ The feedstock used to evaluate catalyst H contained 1290 parts per million nitrogen.

The preceding demonstrate that:

(1) acid leaching of a carrier and aging of the so-leached carrier in ammonium hydroxide imparts a greater catalytic activity even absent multiple impregnations of catalytic metals; catalyst G vs. F;

(2) multiple impregnations of the catalytic metals imparts a greater activity index than does a single impregnation of each metal and that such enhancement of activity can be expected even on an unleached carrier; catalyst H vs. F; and (3) the greatest activity can be expected from a combination of acid leaching, aging and multiple impregnation of the carrier; catalyst I.

I claim:

1. A composition having catalyst activity for desulfurization and denitrification of hydrocarbons with hydrogen that comprises: a carrier comprising alumina that has been impregnated, in separate steps, with an amount sufficient to impart said catalytic activity of a Group VIII metal and of a Group VI metal, each of said impregnation steps having been followed by drying of the impregnated carrier and calcining of the dried composite to a temperature between about 800° F. and 1200° F., wherein said Group VI metal is deposited on said carrier in an initial and final impregnation and said Group VIII metal is deposited on said carrier by at least two intervening impregnation steps.

2. The composition of claim 1 wherein said Group VIII metal is nickel and said Group VI metal is molybdenum.

3. The composition of claim 2 wherein said carrier is treated prior to said impregnations with a mineral acid at a temperature between about 75° and 220° F. to dissolve between about 1 and 7 weight percent of said carrier.

4. A composition having catalytic activity for the desulfurization and denitrification of hydrocarbons with hydrogen that comprises: catalytic amounts of Group VIII and a Group VI metal supported on a carrier comprising alumina that has been leached with a strong mineral acid at a temperature between about 75° and 220° F. to dissolve from 1 to about 7 weight percent of said carrier and thereby obtain an acid leached carrier which has been aged in ammonium hydroxide having a pH from about 9.5 to 11 for about 2 to 24 hours to obtain an acid leached and aged carrier which has been impregnated with said Group VIII and Group VI metals.

5. The composition of claim 4 wherein at least one of said metals has been deposited on said carrier by at least two impregnation steps, each of said impregnation steps having been followed by drying of the impregnated carrier and calcining of the dried composite to a temperature between about 800° F. and 1200° F.

6. The composition of claim 5 that is obtained by impregnating said carrier by an initial and a final impregnation of said Group VI metal.

7. The composition of claim 6 wherein said Group VI metal is molybdenum.

8. The composition of claim 5 wherein said Group VIII metal is deposited on said carrier by at least two impregnation steps.

9. The composition of claim 8 wherein said Group VIII metal is nickel.

10. The composition of claim 5 wherein said Group VI metal is deposited on said carrier in an initial and final impregnation and said Group VIII metal is deposited on said carrier by at least two intervening impregnation steps.

11. The composition of claim 10 wherein said Group VIII metal is nickel and said Group VI metal is molybdenum.

References Cited by the Examiner
UNITED STATES PATENTS

| 2,949,429 | 8/1960 | Bailey et al. | 252—472 |
| 3,114,701 | 12/1963 | Jacobson et al. | 208—254 |
| 3,172,864 | 3/1965 | Unverferth | 208—254 |
| 3,189,540 | 6/1965 | Kozlowski et al. | 208—254 |

DELBERT E. GANTZ, *Primary Examiner.*

S. P. JONES, *Assistant Examiner.*